(12) United States Patent
Miller et al.

(10) Patent No.: US 9,886,311 B2
(45) Date of Patent: *Feb. 6, 2018

(54) JOB SCHEDULING MANAGEMENT

(71) Applicant: International Business Machines Corporation, Armonk, NY (US)

(72) Inventors: Dash D. Miller, St. Louis Park, MN (US); Miguel A. Perez, Miami, FL (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 117 days.

This patent is subject to a terminal disclaimer.

(21) Appl. No.: 14/695,164

(22) Filed: Apr. 24, 2015

(65) Prior Publication Data
US 2016/0314020 A1    Oct. 27, 2016

(51) Int. Cl.
*G06F 9/46* (2006.01)
*G06F 9/50* (2006.01)
*G06F 11/34* (2006.01)
*G06F 11/30* (2006.01)

(52) U.S. Cl.
CPC ........ *G06F 9/5011* (2013.01); *G06F 11/3024* (2013.01); *G06F 11/3409* (2013.01)

(58) Field of Classification Search
CPC . G06F 9/5011; G06F 11/3024; G06F 11/3409
USPC ......................................................... 718/104
See application file for complete search history.

(56) References Cited

U.S. PATENT DOCUMENTS

| 6,618,742 B1 * | 9/2003 | Krum ..................... G06F 9/505 702/186 |
| 6,889,243 B1 | 5/2005 | Hondou et al. |
| 7,721,290 B2 | 5/2010 | Horikawa |
| 7,783,853 B1 | 8/2010 | Rhee et al. |

(Continued)

FOREIGN PATENT DOCUMENTS

CN    103488691 A    1/2014

OTHER PUBLICATIONS

Gyires T., "A Resource Allocation Protocol for Providing Quality of Service in Grid Computing," 2006 International Conference on Internet and Web Applications and Services, Feb. 19-25, 2006.*

(Continued)

*Primary Examiner* — Wei Zhen
*Assistant Examiner* — Andrew M Lyons
(74) *Attorney, Agent, or Firm* — Nathan M. Rau

(57) ABSTRACT

Aspects of the present disclosure are directed toward collecting resource utilization data for a set of system components of a computing system. The resource utilization data may include performance records for a set of jobs. By analyzing the collected resource utilization data for the set of system components, a resource allocation may be identified for a particular job of the set of jobs. Aspects are also directed toward determining, based on the resource allocation for the particular job and the resource utilization data for the set of system components, a first execution time for the particular job. The first execution time may be a time when the computer system achieves a resource availability threshold with respect to the resource allocation. Aspects are also directed toward performing the particular job at the first execution time.

14 Claims, 5 Drawing Sheets

(56) References Cited

U.S. PATENT DOCUMENTS

| | | | |
|---|---|---|---|
| 7,844,968 B1* | 11/2010 | Markov | G06F 9/4881 709/226 |
| 8,261,277 B2 | 9/2012 | Prabhakar et al. | |
| 8,438,570 B2 | 5/2013 | Ferdous et al. | |
| 8,689,220 B2 | 4/2014 | Prabhakar et al. | |
| 8,713,179 B2 | 4/2014 | Dawson et al. | |
| 2005/0114274 A1* | 5/2005 | Dube | G06Q 30/0283 705/400 |
| 2005/0268299 A1* | 12/2005 | Picinich | G06F 9/485 718/100 |
| 2005/0283786 A1* | 12/2005 | Dettinger | G06Q 10/0633 718/104 |
| 2007/0143765 A1* | 6/2007 | Aridor | G06F 9/5011 718/104 |
| 2008/0010642 A1 | 1/2008 | MacLellan et al. | |
| 2008/0086734 A1 | 4/2008 | Jensen et al. | |
| 2009/0012930 A1* | 1/2009 | Jackson | G06F 9/505 |
| 2009/0199047 A1 | 8/2009 | Vaitheeswaran et al. | |
| 2009/0241117 A1 | 9/2009 | Dasgupta et al. | |
| 2010/0043009 A1* | 2/2010 | Marchand | G06F 9/4881 718/104 |
| 2010/0076856 A1* | 3/2010 | Mullins | G06Q 30/0601 705/26.1 |
| 2010/0122255 A1* | 5/2010 | Druyan | G06F 9/4881 718/102 |
| 2010/0131592 A1* | 5/2010 | Zhang | G06F 9/5044 709/203 |
| 2010/0131957 A1* | 5/2010 | Kami | G06F 9/5077 718/104 |
| 2010/0257531 A1* | 10/2010 | Barsness | G06F 9/4893 718/102 |
| 2010/0333105 A1* | 12/2010 | Horvitz | G06F 9/4893 718/105 |
| 2011/0061057 A1 | 3/2011 | Harris et al. | |
| 2011/0154353 A1* | 6/2011 | Theroux | G06F 9/5038 718/104 |
| 2011/0154358 A1* | 6/2011 | Di Balsamo | G06F 9/505 718/105 |
| 2011/0270795 A1* | 11/2011 | Smith | G06F 9/5011 706/52 |
| 2011/0288900 A1* | 11/2011 | McQueen | G06Q 10/06311 705/7.16 |
| 2011/0289507 A1* | 11/2011 | Khan | G06F 8/451 718/104 |
| 2012/0030679 A1* | 2/2012 | Ferdous | G06F 9/5044 718/101 |
| 2012/0060165 A1 | 3/2012 | Clarke | |
| 2012/0110582 A1* | 5/2012 | Ferdous | G06F 11/3442 718/101 |
| 2012/0317578 A1* | 12/2012 | Kansal | G06F 9/5077 718/104 |
| 2013/0103835 A1* | 4/2013 | Yotsutani | G06F 9/4887 709/225 |
| 2013/0111479 A1 | 5/2013 | Chen et al. | |
| 2013/0124669 A1 | 5/2013 | Anderson et al. | |
| 2013/0151707 A1* | 6/2013 | Boutin | G06F 9/5077 709/226 |
| 2013/0191840 A1* | 7/2013 | Barsness | G06F 9/5077 718/104 |
| 2013/0191843 A1 | 7/2013 | Sarkar et al. | |
| 2013/0219407 A1 | 8/2013 | Weinman, Jr. | |
| 2013/0262556 A1 | 10/2013 | Xu et al. | |
| 2013/0298134 A1* | 11/2013 | Jackson | G06F 9/505 718/104 |
| 2014/0075139 A1 | 3/2014 | Reed et al. | |
| 2014/0149987 A1* | 5/2014 | Barillari | G06F 9/4843 718/101 |
| 2014/0165070 A1 | 6/2014 | Persikov et al. | |
| 2014/0289733 A1* | 9/2014 | Fritz | G06F 9/5066 718/104 |
| 2014/0298343 A1 | 10/2014 | Rajan et al. | |
| 2014/0325523 A1* | 10/2014 | Picinich | G06F 9/485 718/104 |
| 2015/0020075 A1 | 1/2015 | Glew et al. | |
| 2015/0052531 A1 | 2/2015 | Helak et al. | |
| 2015/0199218 A1* | 7/2015 | Wilson | G06F 9/5011 718/104 |
| 2015/0295808 A1 | 10/2015 | O'Malley et al. | |

OTHER PUBLICATIONS

Meyer L., Scheftner D., Vockler J., Mattoso M., Wilde M., Foster I., "An Opportunistic Algorithm for Scheduling Workflows on Grids," VECPAR 2006: High Performance Computing for Computational Science, 2007, pp. 1-12.*

Nathani A., Chaudhary S., and Somani G., "Policy based resource allocation in IaaS cloud," Future Generation Computing Systems vol. 28, Issue 1, Jan. 2012, pp. 94-103.*

Accelerated Examination Support Document, U.S. Appl. No. 14/978,930, signed Dec. 22, 2015 11 pgs.

List of IBM Patents or Patent Applications Treated as Related, signed Dec. 22, 2015. 2 pgs.

Miller, et al., "Job Scheduling Management", Accelerated Examination Request, U.S. Appl. No. 14/978,930, filed Dec. 22, 2015.

Adaptive Computing, "Accounting: Job and System Statistics," Moab Adaptive Computing Suite Administrator's Guide, Section 5.4, Aug. 13, 2005, 10 pages, last retrieved from docs.adaptivecomputing.com/macs/9.2accounting.php on Apr. 1, 2016.

Ganapathi et al., "Statistics-Driven Workload Modeling for the Cloud," Jan. 15, 2008, 8 pages, last retrieved from yanpeichen.com/professional/smdb-22.pdf on Mar. 31, 2016.

Grandl et al., "Multi-Resource Packing for Cluster Schedulers," Jul. 6, 2014, 14 pages, last retrieved from https://www.cs.smu.edu/~xia/resources/Documents/grandl_sigcomm14.pdf on Apr. 1, 2016.

Ohio Supercomputer Center, "Monitoring and Managing Your Job," Jul. 16, 2012, 8 pages, last retrieved from https://www.osc.edu/supercomputing/batch-processing-at-osc/monitoring-and-managing-your-job on Mar. 31, 2016.

Smith et al., "Resource Selection Using Execution and Queue Wait Time Predictions," Computer Sciences Corporation, Jul. 2002, pp. 1-7, last retrieved from https://www.nas.nasa.gov/assets/pdf/techreports/2002/nas-02-003.pdf on Apr. 1, 2016.

Zhang et al., "Performance Modeling and Optimization of Deadline-Driven Pig Programs," ACM, Jun. 15, 2009, 29 pages, last retrieved from www.labs.hpe.com/people/lucy_cerkasova/papers/Pig-TAAS-cr.pdf on Apr. 1, 2016.

* cited by examiner

JOB SCHEDULING MANAGEMENT

BACKGROUND

Batch processing is one tool that can be used to facilitate job execution on computer systems. Batch processing involves executing jobs on computers automatically without user input. Batch processing can be completed through predefined processes, in comparison to other methods for job execution which can require interaction with human or system administrators.

SUMMARY

Aspects of the present disclosure, in certain embodiments, are directed toward collecting resource utilization data for a set of system components of a computing system. The resource utilization data may include performance records for a set of jobs. Aspects are also directed toward identifying, by analyzing the collected resource utilization information for the set of system components, a resource allocation for a job of the set of jobs. Aspects are also directed toward determining, based on the resource allocation for the particular job and the resource utilization data for the set of system components, a first execution time for the particular job. The first execution time may be a time when the computer system achieves a resource availability threshold with respect to the resource allocation. Aspects are also directed toward performing the particular job at the first execution time.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
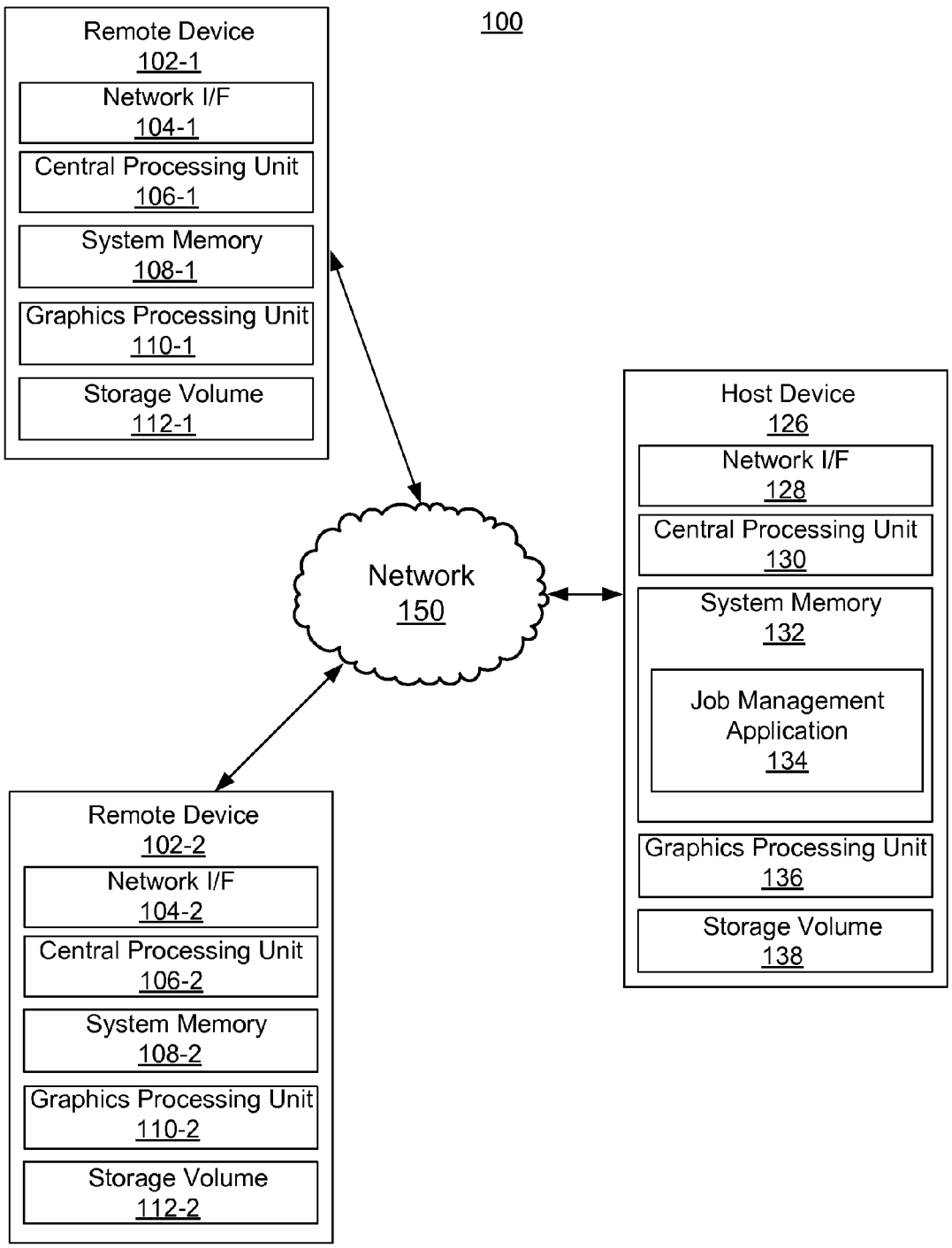
FIG. 1 is a diagrammatic illustration of an example computer system, according to embodiments.

While embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to various embodiments of a system and method for managing job scheduling in a computer system. More particular aspects relate to using resource utilization data for system components as well as allocating resources for a particular job to determine an execution time for the particular job. The method may include collecting, using a set of performance monitors, resource utilization data for the system components of the computer system. Through analyzing the collected resource utilization data, the method may identify a resource allocation for a particular job of the set of jobs. Based on the resource allocation for the particular job and the resource utilization data for the system components, a first execution time may be determined for the particular job, and the particular job may be performed at the first execution time.

Batch processing is one tool that can be used to facilitate job execution on computer systems. By leveraging batch processing techniques, computer tasks can be managed such that they can be scheduled and executed successively, lessening the need for manual intervention. Aspects of the present disclosure, however, relate to the recognition that, in certain instances, conventional batch processing systems will execute a job as soon as the necessary resources (e.g., hardware resources, network bandwidth, software parameters) become available, which can lead to contention for system resources and necessitate human intervention to efficiently manage job scheduling. Accordingly, aspects of the present disclosure, in certain embodiments, relate to collecting resource utilization data for the computer system, identifying the resources needed by the particular job, and using this information to determine an appropriate time for scheduling performance of the particular job. Aspects of the present disclosure may provide benefits associated with job management efficiency, reduced manual labor cost, and system performance.

Aspects of the present disclosure relate to various embodiments of a system and method for managing job scheduling in a computer system. More particular aspects relate to using resource utilization data for a set of system components as well as a resource allocation for a particular job to determine an execution time for the particular job. The method and system may work on a number of devices and operating systems. Aspects of the present disclosure, in certain embodiments, include collecting resource utilization data for a set of system components of the computer system. The resource utilization data may be collected using a set of performance monitors. The resource utilization data may include performance records for a set of jobs. In certain embodiments, the resource utilization data may include historical resource utilization data as well as current resource utilization data for the set of system components. In certain embodiments, collecting the resource utilization data for the set of system components may include establishing a data collection time interval for the set of performance monitors, and initiating periodic data collection of the resource utilization data based on the data collection time interval.

Aspects of the present disclosure, in certain embodiments, are directed toward identifying a resource allocation for a particular job of the set of jobs. Identifying the resource allocation for the particular job may include analyzing the collected resource utilization information for the set of system components. In certain embodiments, identifying the resource allocation for the particular job may include locating a set of summary records corresponding to a set of execution instances of the particular job. The summary records may include a job execution status and historical resource usage data for the set of execution instances of the particular job. Further, identifying the resource allocation for the particular job may include determining a subset of the set of summary records having a job execution status that indicates a successful execution of the particular job. Based on the historical resource usage data for the set of execution instances of the particular job, the method may include computing the resource allocation for the particular job.

In certain embodiments, analyzing the collected resource utilization information may include selecting an address space for execution of the particular job. More particularly, in certain embodiments, analyzing the collected resource information may include identifying, based on the current resource utilization data for the set of system components, a set of address spaces for job execution. Using the historical resource utilization data for the set of system components, the method may include generating a set of aggregate summary records for the set of address spaces. Based on the set of aggregate summary records for the set of address spaces, the method may include selecting a first subset of address spaces for execution of the particular job.

Aspects of the present disclosure, in certain embodiments, are directed toward determining, based on the resource allocation for the particular job and the resource utilization data for the set of system components, a first execution time for the particular job. In certain embodiments, the first execution time may be a time when the computer system achieves a resource availability threshold with respect to the resource allocation. In certain embodiments, determining the first execution time for the particular job may include comparing the resource allocation for the particular job with a set of time slots of the current resource utilization data. In response to comparing the resource allocation for the particular job with the set of time slots, the method may include determining a first time slot of the set of time slots that achieves a resource availability threshold with respect to the resource allocation for the particular job. Accordingly, the method may include scheduling the particular job of the set of jobs in the first time slot, and performing the particular job at the first execution time corresponding to the first time slot.

In certain embodiments, aspects of the present disclosure are directed toward determining, in response to comparing the resource allocation for the particular job with the set of time slots, that the first time slot fails to achieve a resource availability threshold with respect to the resource allocation for the particular job. The method may then include registering the particular job in a hold queue for subsequent scheduling. In response to determining that a second time slot of the set of time slots achieves the resource availability threshold, the method may include scheduling the particular job in the second time slot. In certain embodiments, the method may then include performing the particular job at a second execution time corresponding to the second time slot.

Turning now to the figures, FIG. 1 is a diagrammatic illustration of an example computer system 100, consistent with embodiments of the present disclosure. In certain embodiments, the computer system 100 can include one or more remote devices 102 and one or more host devices 126. Although two remote devices 102-1, 102-2 are shown in FIG. 1 for purposes of illustration, it is to be understood that other embodiments may include a single remote device or more than two remote devices. Remote devices 102 and host device 126 may be located separately from each other and communicate over a network 150 in which the host device 126 comprises a central hub from which remote devices 102 can establish a communication connection. Alternatively, the host device and remote devices may be configured in any other suitable relationship (e.g., in a peer-to-peer or other relationship).

In certain embodiments the network 150 can be implemented using any number of any suitable communications topologies (e.g., wide area network (WAN), local area network (LAN), Internet, Intranet, hardwire, wireless link, etc.). In certain embodiments, the network 150 can be implemented within a cloud computer system, or using one or more cloud computing services. Consistent with various embodiments, a cloud computer system can include a network-based, distributed data processing system that provides one or more cloud computing services. In certain embodiments, a cloud computer system can include many computers, hundreds or thousands of them, disposed within one or more data centers and configured to share resources over the network. However, it is to be understood that cloud computer systems are not limited to those whose include hundreds or thousands of computers and can include few than hundreds of computers.

In certain embodiments, host device 126 can include a job management application 134 included in the system memory 132. In certain embodiments, the job management application 134 may be configured to collect resource utilization data for a set of system components, identify a resource allocation for a particular job, determine a first execution time for the particular job, and perform the particular job at the first execution time. The job management application 134 may also be configured to perform other tasks for managing jobs in a computer system. In certain embodiments, the job management application 134 of the host device 126 may be configured to communicate using the network 150 in order to manage jobs for the remote devices 102. Other configurations and uses of the job management application 134 are also possible.

Consistent with various embodiments, each of host device 126 and remote devices 102 is implemented as a computer system including a respective set of system components. In certain embodiments, one or more of host device 126 and remote devices 102 may be equipped with a respective display or monitor. In certain embodiments, each computer system may include at least one central processing unit 106, 130; system memories 108, 132; internal or external network interface or communications devices 104, 128 (e.g., modem, network cards, etc.); and/or optional input devices (e.g., a keyboard, mouse, or other input device), as well as commercially available and custom software (e.g., browser software, communications software, server software, natural language processing software, search engine and/or web crawling software, filter modules for filtering content based upon predefined criteria, etc.). In certain embodiments, host device 126 and remote devices 102 may each include a graphics processing unit 110, 136 and a storage volume 112, 138. In certain embodiments, resource utilization data may be collected from the system components described herein by the management application 134 to facilitate the management of batch processing jobs. Other system components and configurations of host device 126 and remote devices 102 are also possible.

In certain embodiments, each of the computer systems may be implemented as one of a server, desktop, laptop, or hand-held devices. In addition, the job management application 134 may include one or more modules or units to perform the various functions of embodiments described herein (e.g., collecting resource utilization data, identifying a resource allocation for a particular job, determining a first execution time for the particular job, and performing the particular job at the first execution time).

Figure 2:
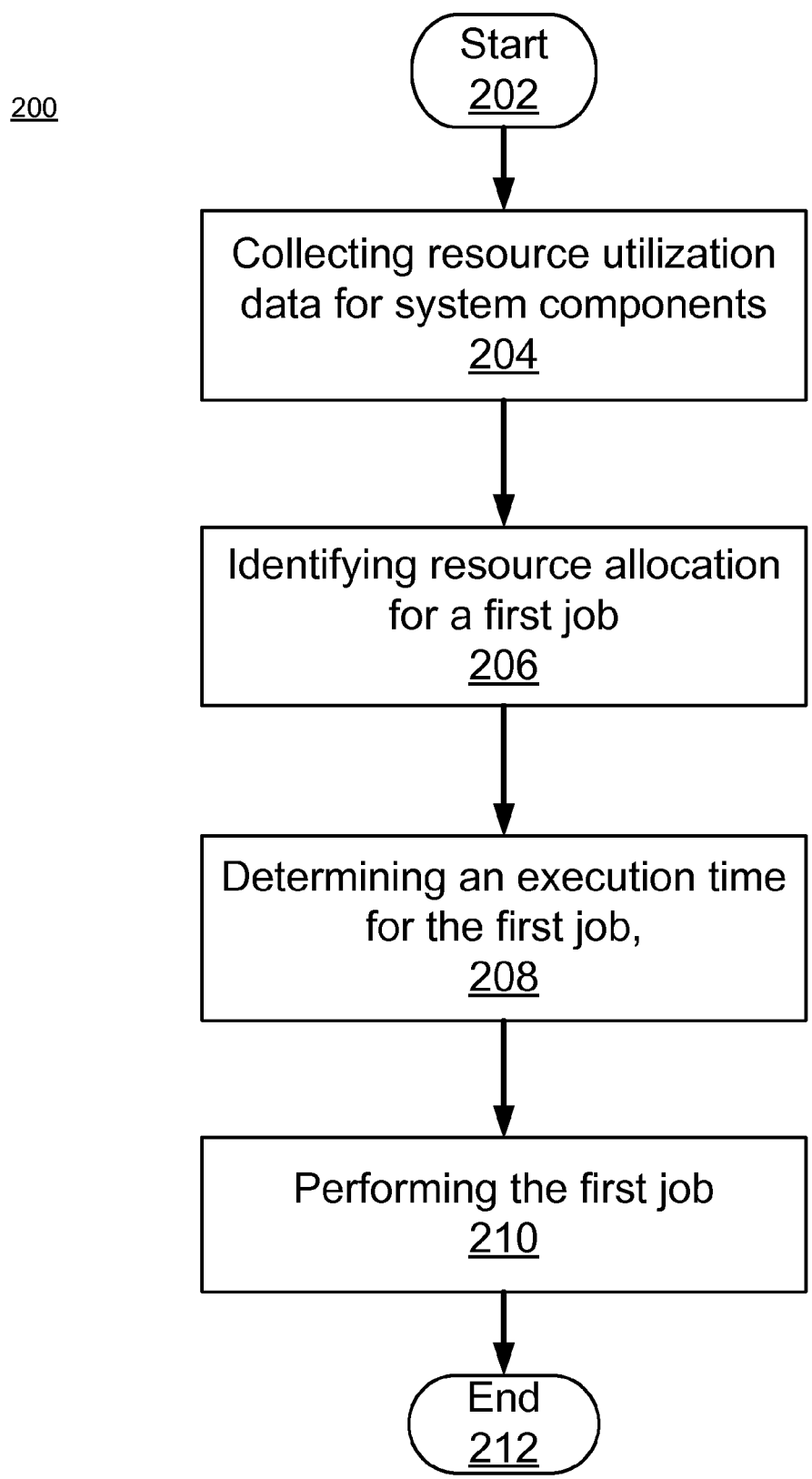
FIG. 2 is a flowchart illustrating a method for managing job scheduling in a computer system, according to embodiments.

FIG. 2 is a flowchart illustrating a method for managing job scheduling in a computer system, consistent with embodiments of the present disclosure. Aspects of FIG. 2 are directed toward performing a particular job of a set of jobs at a first execution time based on resource utilization data for a set of system components. The visual arrangement of blocks in the flowchart of FIG. 2 is not to be construed as limiting the order in which the individual steps may be performed, as certain embodiments may perform the operations of FIG. 2 in alternative orders. The method 200 may begin at block 202 and end at block 212.

Consistent with various embodiments, at block 204 the method 200 may collect resource utilization data for a set of system components of the computer system. Generally, the set of system components may include hardware and/or software elements of a computing device, such as, but not limited to, a central processing unit (CPU), graphics processing unit (GPU), volatile and non-volatile memory, storage devices, operating system, power supply, network communications devices, and the like. The resource utilization data may be statistics, values, and/or other information that quantitatively or qualitatively indicates the degree of usage of a particular system component. In certain embodiments, the resource utilization data may indicate the degree of usage in relation to a respective maximum usage threshold (e.g., system architecture limitations) of the particular system component. As examples, the resource utilization data may include, but is not limited to, CPU bandwidth utilization (e.g., CPU Core 1 is being used at 47% of its capacity), storage device utilization (e.g., storage volume C is 68% full), and the like. In certain embodiments, the resource utilization data may be expressed in absolute numbers that indicate the activity of a particular system component (e.g., Storage Volume Output: 50 megabits per second (MB/s), CPU Usage: 20 million instructs per second (MIPs)). As additional examples, the resource utilization data may include data such as, but not limited to, central storage pages, device input MB/s, device output MB/s, channel subsystem network usage, and storage subsystem cache usage over time. Other types of resource utilization data are also possible.

In certain embodiments, the resource utilization data may include performance records for a set of jobs. Generally, the set of jobs may be one or more units of work for an operating system of the computing system. More particularly, the set of jobs may refer to a task, process or program executed in a batch processing system. As an example, the set of jobs may include the extraction, transformation, and load (ETL) process in a data warehousing environment. As an additional example, the set of jobs may include the process of converting a computer file from one format to another. As described herein, the resource utilization data may include performance records for the set of jobs. The performance records may include data regarding the time, date, duration, memory address space, resource usage, and execution status of each job of the set of jobs (e.g., a particular job began on Tuesday March 19th at 4:00 PM, ran for 30 minutes, used 10 CPU MIPS, was executed in a first designated memory address space, and completed successfully).

In certain embodiments, the resource utilization data may include both historical resource utilization data for the set of components as well as current resource utilization data for the set of components. The historical resource utilization data may include archived resource usage trends for each system component of the respective computer system over an extended time period. For instance, the historical resource utilization data may include information regarding regularly scheduled system jobs performed by each component of the respective computer system and the amount of resources used for each task. The current resource utilization data may include information regarding the current usage state of each system component of the computer system, which jobs are currently being executed and scheduled to execute, and the corresponding address spaces for each job.

As described herein, at block 204 the method 200 may include collecting the resource utilization data. Collecting the resource utilization data may include gathering, assembling, aggregating, or otherwise obtaining the resource utilization data. In certain embodiments, the resource utilization data may be collected using a set of performance monitors. Generally, the set of performance monitors may include applications, widgets or other programs configured to gather data (e.g., resource utilization data) regarding the operational state of a computer system. As an example, aspects of the present disclosure are directed toward using a batch job monitoring parameter referred to herein as the "Batchmon parameter" or "Batchmon". The Batchmon parameter may be configured to organize a history of address space resource utilization data (e.g., "HASRU") by collecting resource utilization data from each address space at a particular time interval. In certain embodiments, Batchmon may include utilizing existing performance monitors already active on the computer system (e.g., System Management Facility "SMF," Resource Management Facility "RMF"), and aggregating the resource utilization data from other existing sources.

In certain embodiments, collecting the resource utilization data for the set of system components may include establishing a data collection time interval for the set of performance monitors. The data collection time interval may be a specified time frame at which the performance monitors regularly collect the resource utilization data. For instance, the data collection time interval may be specified as 0.1 seconds, 30 seconds, 1 minute, 10 minutes, 30 minutes, or other appropriate time interval appropriate for the particular component of the computer system. Based on the data collection time interval, the method 200 may include initiating periodic collection of the resource utilization data.

Consistent with various embodiments, at block 206 the method 200 may include identifying a resource allocation for a particular job of the set of jobs. In embodiments, a job is a separately executable unit of work. The particular job may be a particular job that is scheduled for execution on the computer system. In certain embodiments, the particular job may be part of a batch job process. The particular job may be a job that is routinely performed by the computer system, with available performance records that indicate the time, date, resource requirements, memory address space requirements, and the like. The resource allocation may be a calculated estimate of the amount and type of system resources needed to facilitate successful execution of the particular job. The resource allocation may also include the time duration that the resources are needed, memory address spaces, or other conditions related to the particular job.

In certain embodiments, identifying the resource allocation for the particular job may include locating a set of summary records for the particular job in the collected resource utilization data for the set of system components. The set of summary records may correspond to a set of execution instances of the particular job. For example, the summary records may be reports or descriptions that are generated upon completion (e.g., successful or unsuccessful completion) of the particular job each time the particular job runs on the computer system. The summary records may include information such as a job execution status (e.g., whether the particular job was executed successfully or unsuccessfully) and historical usage data for each execution instance of the particular job. Block 206 may include analyzing the set of summary records in order to determine a subset of the summary records that have a job execution status indicating successful execution of the particular job. As an example, the method 200 may include analyzing each summary record and removing those summary records that indicate abnormal ending (e.g., based on an ABEND code) or other unsatisfactory condition (e.g., a condition recognized as unsatisfactory based on a condition code) with regard to the particular job.

In response to determining the subset of summary records, the method 200 may include computing the resource allocation for the particular job. In certain embodiments, the resource allocation may be computed based on the historical usage data for each execution instance of the particular job. Aspects of the present disclosure relate to the recognition that, in certain embodiments, only one summary record may be available for the particular job. In such situations, the historical usage data specified in the summary record for that execution instance may be used as the resource allocation. In embodiments with multiple summary records for different execution instances of the particular job, the method 200 may include calculating an aggregate resource usage as the resource allocation. Calculating the aggregate resource usage may include using statistical algorithms including contra-harmonic mean algorithms, quadratic mean algorithms, arithmetic mean algorithms, geometric mean algorithms, and the like. For instance, in certain embodiments, a particular job with three summary records indicating CPU usage statistics of 23 MIPS, 28 MIPS, and 25 MIPS, may be computed to have a mean CPU usage of 25.33 MIPS. Other methods of calculating the resource allocation are also possible.

Aspects of the present disclosure, in certain embodiments, are directed toward analyzing the collected resource utilization information for the set of system components. In certain embodiments, analyzing the resource utilization information may include determining one or more address spaces for execution of the particular job. Generally, the address spaces may be discrete locations that may each correspond to a network host, peripheral device, disk sector, memory, or other logical or physical entity. The particular job may occupy one or more address spaces during execution depending on the nature of the job.

Accordingly, in certain embodiments, the method 200 may include identifying a set of address spaces used for job execution by analyzing the current resource utilization data for the set of system components. As described herein, the set of address spaces may include address spaces for a variety of physical and logical entities. In certain embodiments, the set of address spaces may include address spaces that the particular job has used previously during prior execution instances. The set of address spaces may also include address spaces used for other jobs, as well as unoccupied/unused address spaces.

Using the historical resource utilization data for the set of system components, the method 200 may include generating a set of aggregate summary records regarding the set of address spaces. The aggregate summary records may be comprehensive or cumulative reports that include data regarding previous jobs that have been executed in each respective address space, as well as the execution status and resource usage of those jobs. Based on the set of aggregate summary records, the method 200 may include selecting a first subset of address spaces for execution of the particular job. The first subset of address spaces may include one or more address spaces suitable for execution of the particular job. More particularly, the first set of address spaces may be address spaces that have facilitated successful execution of the particular job in previous execution instances, allow access to resources needed by the particular job, or meet other conditions suitable for execution of the particular job. Other methods of selecting the first subset of address spaces are also possible.

Consistent with various embodiments, at block 208 the method 200 determines a first execution time for the particular job. In certain embodiments, the first execution time for the particular job may be determined based on the resource allocation for the particular job and the resource utilization data for the set of system components. Generally, the first execution time may be a time when the computer system achieves a resource availability threshold with respect to the resource allocation. In certain embodiments, the resource availability threshold may be a predetermined amount of resources (e.g., unscheduled and/or unused processing power or memory) sufficient to execute the particular job. For example, the resource availability threshold may indicate that 30 CPU MIPS, 24 minutes, storage output of 20 MB/s, and 20 memory pages are requested to facilitate execution of the particular job. In some embodiments, the resource availability threshold may be equal to the resource allocation. In other embodiments, the resource availability threshold may be greater than the resource allocation (e.g., a greater amount of resources than what is strictly necessary may be preferable to facilitate scalable performance of the particular job).

In certain embodiments, determining the first execution time for the particular job may include comparing the resource allocation for the particular job with a set of time slots of the current resource utilization data. A job may use the entire time slot, a portion of the time slot, or multiple time slots. The time slots may be a duration or period of time during which a particular job is being executed by the computer system. For example, in certain embodiments, each address space of the computer system may be segmented/designated to a 30 minute time interval for execution of various jobs based on how long those jobs took to complete at said address space previously. Put differently, aspects of the method may record the duration and resources taken to complete a specific job at an address space, designate that address space with one or more time intervals associated that duration, and use that time interval designation to schedule that specific job in a future instance (e.g., when resources are too low to complete the job when requested). Embodiments may also associate data about the resource allocation needed to complete a job with the time slot for the job. As described herein, the resource allocation of the particular job may be compared with the set of time slots of the current resource utilization data. Generally, comparing the resource allocation to the set of time slots may include examining the resources (e.g., type, amount) used by the computer system during a particular time slot, and contrasting these resources with those required by the particular job. In response to comparing the resource allocation for the particular job with the set of time slots, the method 200 may include determining a first time slot of the set of time slots that achieves the resource availability threshold with respect to the resource allocation for the particular job. In response to determining that the first time slot achieves the resource availability threshold, the method 200 may include scheduling the particular job in the first time slot. Scheduling the particular job may include entering, organizing, or otherwise appointing the particular job for execution at the first time slot.

Aspects of the present disclosure relate to the recognition that, in certain embodiments, the first time slot may not satisfy the resource requirements of the particular job. In certain embodiments, no time slots may be available that achieve the resource availability threshold. Accordingly, in certain embodiments, aspects of the present disclosure are directed toward placing the particular job in a hold queue for scheduling at a later time. More particularly, in response to comparing the resource allocation for the particular job with the set of time slots, the method 200 may include determining that the first time slot fails to achieve a resource availability threshold with respect to the resource allocation for the particular job. For instance, the first time slot may be able to provide 30 MIPS for use by the particular job, while the particular job requires at least 45 MIPS to execute. In response to determining that the first time slot (or multiple time slots) do not achieve the resource availability threshold, the method 200 may include registering the particular job in a hold queue (e.g., sleep queue) for subsequent scheduling. The hold queue may be a sequence of data items (e.g., jobs) waiting for action or execution at a later time. In response to determining that a second time slot of the set of time slots achieves the resource availability threshold, the particular job may be scheduled in the second time slot. As an example, in certain embodiments, a particular job being executed by the computer system may complete, freeing up resources for execution of the particular job. Other methods of rescheduling the particular job are also possible.

Consistent with various embodiments, at block 210 the method 200 may include performing the particular job at the first execution time. The first execution time may be the timeframe in which particular job is scheduled for execution as described herein. Generally, performing the particular job may include instantiating an execution instance of the particular job at the first execution time. As described herein, the particular job may make use of multiple address spaces of the computer system. In certain embodiments, performing the particular job may include scheduling the particular job for routine execution each day or week at the first execution time. Other methods of performing the particular job are also possible.

Figure 3:
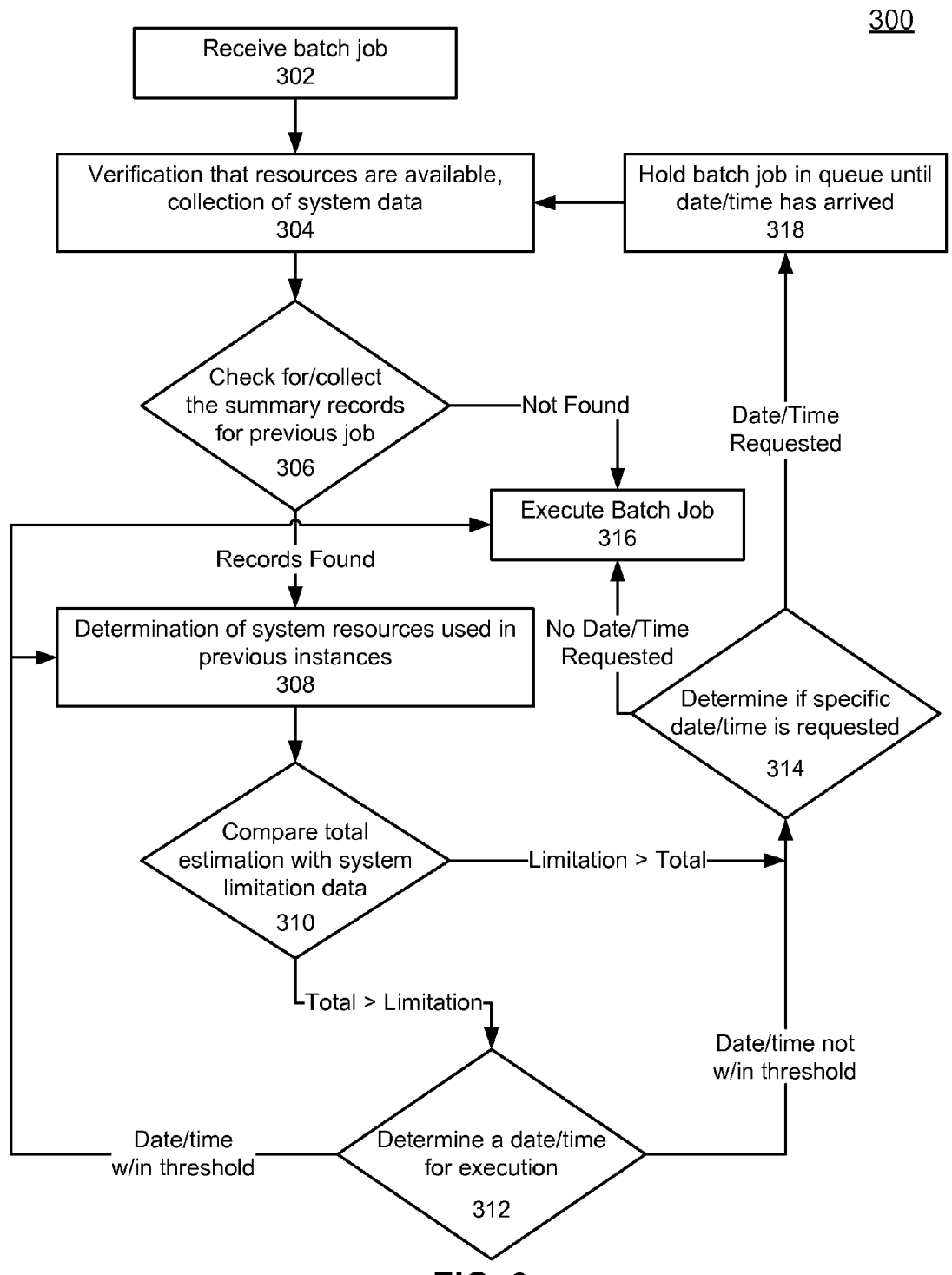
FIG. 3 is a flowchart illustrating a method for managing job scheduling in a computer system, according to embodiments.

FIG. 3 is a flowchart illustrating a method 300 for managing job scheduling in a computer system, consistent with embodiments of the present disclosure. As described herein, at block 302 the method 300 may include receiving a particular job (e.g., batch job) from a user (e.g., customer, system administrator). At block 304 the method may include querying the computer system to verify that the job resources requested by the batch job are available (e.g., storage volumes are available on the network, sufficient memory is available). In certain embodiments, the computer system may be configured to wait until all requested resources are available before scheduling the batch job(s).

Further, in certain embodiments, at block 304 the method 300 includes collecting system architecture limitation information for the computer system. As described herein, the information may be collected using one or more performance monitors (e.g., SMF, RMF, OMEGAMON) configured to collect a history of statistic intervals regarding the system resources used when writing to each address space of the computer system. In certain embodiments, the information may be collected by a batch monitoring parameter "Batchmon" configured to organize the information gathered by existing performance monitors. The system architecture limitation information may indicate the total available resources that can be provided by the hardware of the computer system (e.g., maximum CPU MIPS, maximum device I/O throughput). In certain embodiments, the system architecture limitation information may be collected from the recorded data on the previous usage of address spaces of the system components using a performance monitor independent of existing system performance monitors such as a batch monitor address space (BMAS). At block 304 the method 300 may also include querying the system to collect address space reports that indicate the address spaces that are currently being used for job execution.

In certain embodiments, at block 306 the method 300 can collect summary records for previous executions of the particular job. The summary records may indicate the system resources utilized by the particular job (e.g., resource allocation for the particular job), as well as the duration of time (e.g., number of intervals) used for previous executions of the particular job. In certain embodiments, block 306 may be configured to collect the most recent summary record. For example, at block 306 the summary records for the last week may be collected. Aspects of the present disclosure relate to the recognition that, in certain embodiments, the particular job may not have been executed in the last week, and thus summary records for the last week may not be available. Accordingly, in such situations, the method 300 may proceed to block 316 and continue with execution of the particular job.

In certain embodiments, the method 300 may be configured to collect summary records for the particular job that satisfy a recency criterion The recency criterion may be a period of time during which the summary records of the particular job are determined to be a valid indication of the resources required by the particular job. In such embodiments, the summary record for the particular job which satisfies the recency criterion may not be the most recent summary record. For example, in embodiments some jobs may regularly utilize far more/less resources than usual, so a single job performed in the most recent summary record would not be indicative of a typical job, requiring a larger sample (e.g., more than a single week). For another example, in embodiments a job may occur many times in every summary record (e.g., multiple times per week) with a consistent resource utilization, so a smaller recency criterion (e.g., a day) may be used while still capturing the profile of a typical job. The recency criterion may be determined by a user (e.g., system administrator). As examples, the recency criterion may be 1 day, 3 days, 1 week, 2 months, 1 year, or other periods of time. As described herein, in certain embodiments multiple summary records that satisfy the recency criterion may be available for the particular job. Accordingly, at block 306 the method 300 may include computing an aggregate resource estimate for the particular job based on the summary records.

At block 308 the method includes determining the system resources used by the executing processes for previous batch job execution instances. Determining the system resources includes collecting system utilization interval records from the batch monitor address spaces (BMAS). The interval records may indicate the resources used when executing a job on a particular address space for a particular time period (e.g., 30 minutes). The method 300 may then include calculating a total system resource utilization estimation based on the estimated resource allocation for the particular job and the system resources used by jobs currently executing in address spaces of the computer system. In certain embodiments, calculating the total system resource utilization estimation may include summing together the estimated resource allocation for the particular job and the system resources used by jobs currently executing. Other techniques of calculating the total system resource utilization estimation are also possible.

At block 310 the total system resource utilization estimation is compared with the system architecture limitation information for the computer system. In response to comparing the total system resource utilization estimation with the system architecture limitation information, the system may determine whether or not the system architecture limitations are exceeded by the total system resource utilization estimation. In certain embodiments, in response to determining that the system limitations are not exceeded by the total system resource utilization estimation, the method 300 may proceed to block 314. If a specific date or time is requested for execution of the particular job at block 314, the particular job may be held in a wait queue at block 318 until the requested date or time is reached. If no specific date or time is requested, the method 300 may proceed to block 316 and perform the particular job.

In certain embodiments, in response to determining that the system limitations are exceeded by the total system resource utilization estimation, the method 300 may proceed to block 312. At block 312, the method 300 may include determining a date and time for execution of the particular job. At block 316, if the date and time is within a threshold, the job may be executed at this date and time. In certain embodiments, if the date and time determined for execution of the particular job is within a first duration threshold, the method 300 may return to block 308 to determine the system resources used to execute a job on each address space for previous batch job execution instances. The first duration threshold may be a pre-determined period of time (e.g., determined by a user, or by the computer system based on predicted resource availability) for rescheduling of the particular job. For example, the first duration threshold may be 24 hours. Other time periods are also possible. In certain embodiments, if the date and time requested for rescheduling of the particular job exceeds the first duration threshold (e.g., 24 hours), the method 300 may proceed to block 314 and place the particular job in a hold queue for later rescheduling. If no date or time was requested for the job, block 314 may send the job for processing 316. In certain embodiments, the particular job may be rescheduled for one interval (e.g., 30 minutes) after the current time. Other methods for rescheduling the particular job are also possible.

Figure 4:
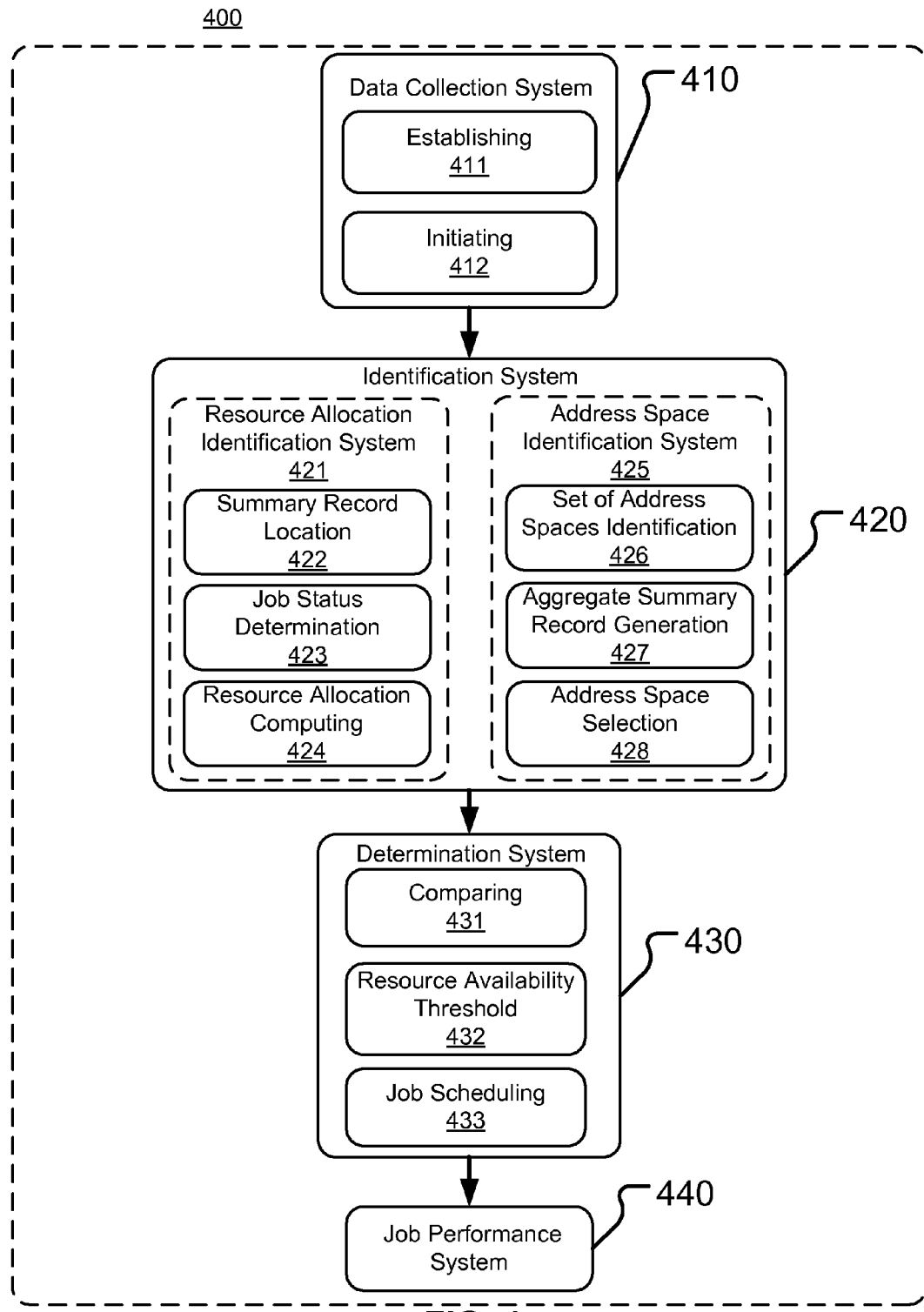
FIG. 4 is a diagram illustrating an example system architecture for managing job scheduling in a computer system, according to embodiments.
Figure 5:
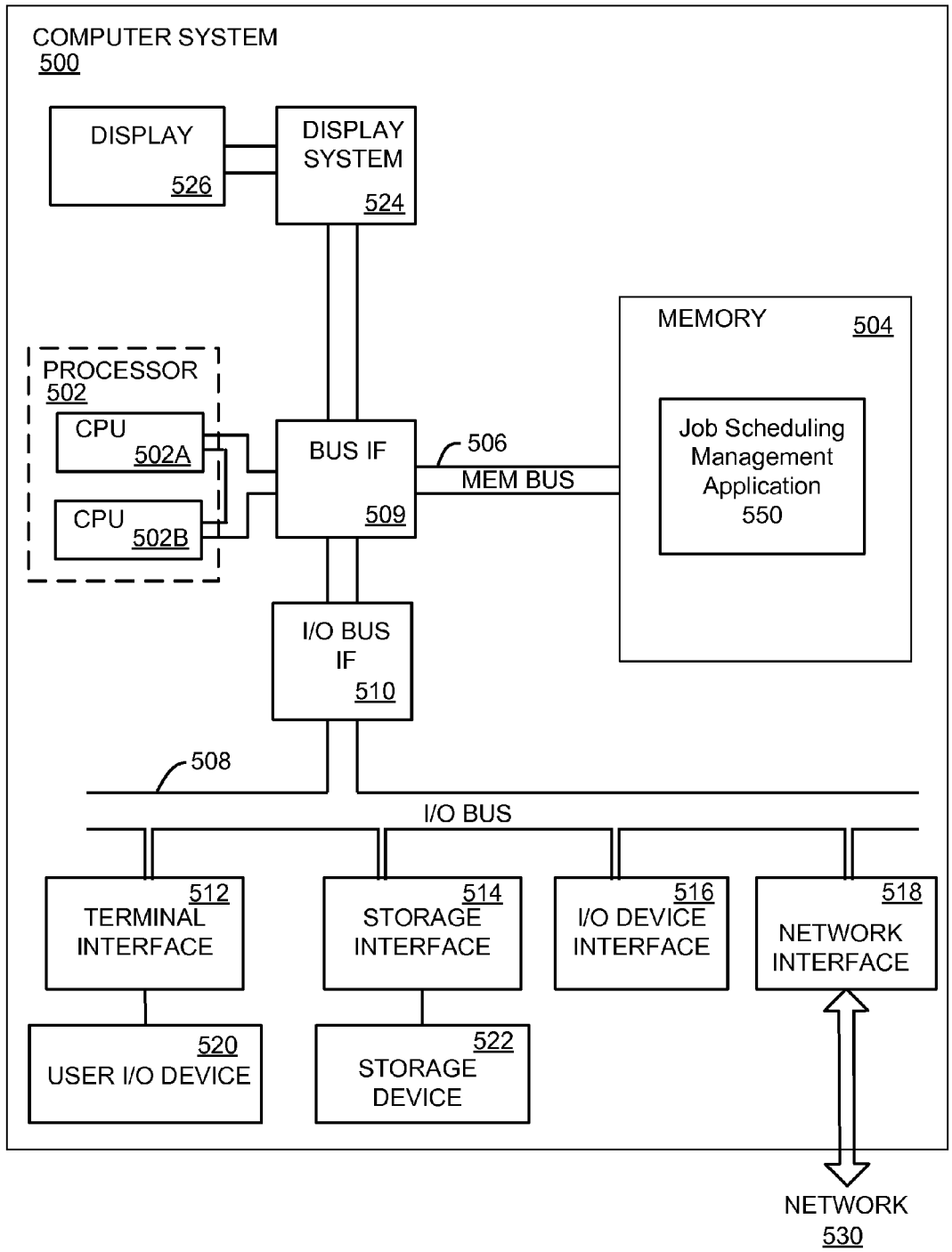
FIG. 5 depicts a high-level block diagram of a computer system for implementing various embodiments.

FIG. 4 is a diagram illustrating an example system architecture 400 for managing job scheduling in a computer system, consistent with embodiments of the present disclosure. The modules within FIG. 4 may be implemented with one or more processors 502 such as is shown in FIG. 5 and/or software such as the job scheduling management application 550 in FIG. 5. The system architecture 400 may be a host device 126 as shown in FIG. 1. As shown in FIG. 4, the system architecture 400 may include a data collection system 410. The data collection system 410 may include an establishing module 411 configured to establish a data collection time interval for a set of performance monitors. The data collection system 410 may also include an initiating module 412 configured to initiate periodic collection of resource utilization data of the computer system. In certain embodiments, the data collection system 410 may substantially correspond with block 204 of FIG. 2.

In certain embodiments, the system architecture 400 may include an identification system 420. The identification system 420 may substantially correspond with block 206 of FIG. 2. The identification system may include resource allocation identification system 421 and an address space identification system 425. The resource allocation system 421 may be configured to identify the resource requirements of a particular job of a batch processing system. Accordingly, the resource allocation system 421 may include a summary record location module 422 configured to locate a set of summary records corresponding to a set of execution instances of the particular job. The set of summary records may include a job execution status and historical resource usage data for the set of execution instances of the particular job. The resource allocation system 421 may include a job status determination module 423 which is configured to determine a subset of the set of summary records that indicate successful termination of the particular job. The resource allocation system 421 may also include a resource allocation computing module 424 which is configured to use the historical resource usage data for the set of execution instances to compute the resource allocation for the particular job.

The address space identification system 425 may be configured to identify one or more address spaces for execution of the particular job. Accordingly, a set of address spaces identification module 426 may be configured to use the current resource utilization data for the set of system components to identify a set of address spaces for job execution. The set of address spaces may be candidate address spaces for execution of the particular job. An aggregate summary record generation module 427 may be configured to generate a set of aggregate summary records for the set of address spaces using the historical resource utilization data for the set of system components. Based on the set of aggregate summary records, an address space selection module 428 may be configured to select a first subset of address spaces from the set of address spaces for execution of the particular job.

In certain embodiments, the system architecture 400 may include a determination system 430. The determination system 430 may substantially correspond with block 208 of FIG. 2. The determination system may include a comparing module 431. The determination system 430 may include a comparing module 431, a resource available threshold module 432, and a job schedule module 433. The comparing module 431 may be configured to compare the resource allocation for the particular job with a set of time slots of the current resource utilization data. In response to comparing the resource allocation for the particular job with the set of time slots, the resource availability threshold module 432 may be configured to determine a first time slot of the set of time slots that achieves the resource availability threshold with respect to the resource allocation for the particular job. Accordingly, the job scheduling module 433 may be configured to schedule the particular job of the set of jobs in the first time slot.

In certain embodiments, the system architecture 400 may include a job performance system 440. The job performance system 440 may substantially correspond with block 210 of FIG. 2. As described herein, the job performance system 440 may be configured to instantiate the particular job at the first execution time determined by the job scheduling module 433.

FIG. 5 depicts a high-level block diagram of a computer system 500 for implementing various embodiments. The mechanisms and apparatus of the various embodiments disclosed herein apply equally to any appropriate computing system. The components of the example computer system 500 shown in FIG. 5 include one or more processors 502, a memory 504, a terminal interface 512, a storage interface 514, an I/O (Input/Output) device interface 516, and a network interface 518, all of which are communicatively coupled, directly or indirectly, for inter-component communication via a memory bus 506, an I/O bus 508, bus interface unit 509, and an I/O bus interface unit 510.

The computer system 500 may contain one or more general-purpose programmable central processing units (CPUs) 502A and 502B, herein generically referred to as the processor 502. In embodiments, the computer system 500 may contain multiple processors; however, in certain embodiments, the computer system 500 may alternatively be a single CPU system. Each processor 502 executes instructions—such as the instructions carried out by the modules within the system architecture 400 in FIG. 4—stored in the memory 504 and may include one or more levels of on-board cache.

In embodiments, the memory 504 may include a random-access semiconductor memory, storage device, or storage medium (either volatile or non-volatile) for storing or encoding data and programs. In certain embodiments, the memory 504 represents the entire virtual memory of the computer system 500, and may also include the virtual memory of other computer systems coupled to the computer system 500 or connected via a network. The memory 504 can be conceptually viewed as a single monolithic entity, but in other embodiments the memory 504 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 504 may store all or a portion of the various programs, modules and data structures for processing data transfers as discussed herein. For instance, the memory 504 can store a job scheduling management application 550. In embodiments, the job scheduling management application 550 may include instructions or statements that execute on the processor 502 or instructions or statements that are interpreted by instructions or statements that execute on the processor 502 to carry out the functions (e.g., the functionality of the modules in the system architecture 400 of FIG. 4) as further described below. In certain embodiments, the job scheduling management application 550 is implemented in hardware via semiconductor devices, chips, logical gates, circuits, circuit cards, and/or other physical hardware devices (e.g., ASIC or FPGA) in lieu of, or in addition to, a processor-based system. In embodiments, the job scheduling management application 550 may include data in addition to instructions or statements.

The computer system 500 may include a bus interface unit 509 to handle communications among the processor 502, the memory 504, a display system 524, and the I/O bus interface unit 510. The I/O bus interface unit 510 may be coupled with the I/O bus 508 for transferring data to and from the various I/O units. The I/O bus interface unit 510 communicates with multiple I/O interface units 512, 514, 516, and 518, which are also known as I/O processors (IOPs) or I/O adapters (IOAs), through the I/O bus 508. The display system 524 may include a display controller, a display memory, or both. The display controller may provide video, audio, or both types of data to a display device 526. The display memory may be a dedicated memory for buffering video data. The display system 524 may be coupled with a display device 526, such as a standalone display screen, computer monitor, television, or a tablet or handheld device display. In one embodiment, the display device 526 may include one or more speakers for rendering audio. Alternatively, one or more speakers for rendering audio may be coupled with an I/O interface unit. In alternate embodiments, one or more of the functions provided by the display system 524 may be on board an integrated circuit that also includes the processor 502. In addition, one or more of the functions provided by the bus interface unit 509 may be on board an integrated circuit that also includes the processor 502.

The I/O interface units support communication with a variety of storage and I/O devices. For example, the terminal interface unit 512 supports the attachment of one or more user I/O devices 520, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 520 and the computer system 500, and may receive output data via the user output devices. For example, a user interface may be presented via the user I/O device 520, such as displayed on a display device, played via a speaker, or printed via a printer.

The storage interface 514 supports the attachment of one or more disk drives or direct access storage devices 522 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 522 may be implemented via any type of secondary storage device. The contents of the memory 504, or any portion thereof, may be stored to and retrieved from the storage device 522 as needed. The I/O device interface 516 provides an interface to any of various other I/O devices or devices of other types, such as printers or fax machines. The network interface 518 provides one or more communication paths from the computer system 500 to other digital devices and computer systems; these communication paths may include, e.g., one or more networks 530.

Although the computer system 500 shown in FIG. 5 illustrates a particular bus structure providing a direct communication path among the processors 502, the memory 504, the bus interface 509, the display system 524, and the I/O bus interface unit 510, in alternative embodiments the computer system 500 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 510 and the I/O bus 508 are shown as single respective units, the computer system 500 may, in fact, contain multiple I/O bus interface units 510 and/or multiple I/O buses 508. While multiple I/O interface units are shown, which separate the I/O bus 508 from various communications paths running to the various I/O devices, in other embodiments, some or all of the I/O devices are connected directly to one or more system I/O buses.

In various embodiments, the computer system 500 is a multi-user mainframe computer system, a single-user system, or a server computer or similar device that has little or no direct user interface, but receives requests from other computer systems (clients). In other embodiments, the computer system 500 may be implemented as a desktop computer, portable computer, laptop or notebook computer, tablet computer, pocket computer, telephone, smart phone, or any other suitable type of electronic device.

FIG. 5 depicts several example components of the computer system 500. Individual components, however, may have greater complexity than represented in FIG. 5, components other than or in addition to those shown in FIG. 5 may be present, and the number, type, and configuration of such components may vary. Several particular examples of additional complexity or additional variations are disclosed herein; these are by way of example only and are not necessarily the only such variations. The various program components illustrated in FIG. 5 may be implemented, in various embodiments, in a number of different manners, including using various computer applications, routines, components, programs, objects, modules, data structures, etc., which may be referred to herein as "software," "computer programs," or simply "programs."

The functionality outlined in the discussions herein regarding FIG. 2, FIG. 3, FIG. 4, and FIG. 5 above may be implemented using program instructions executed by a processing unit, as described in more detail below.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for managing jobs in a computing system, the method being executable by a processor performing operations comprising:
   collecting, using a set of performance monitors, resource utilization data for a set of system components of the computing system, the resource utilization data including performance records for a set of jobs and indicating a degree of usage in relation to a system architecture limitations of a respective system component;
   identifying, by analyzing the resource utilization data for the set of system components, a resource allocation for a particular job of the set of jobs based on a current resource utilization data of the resource utilization data for the set of system components, a set of address spaces for job execution, wherein the set of address spaces has been used previously for a particular job of the set of jobs, wherein the particular job is executed by the computing system at regular intervals and includes available performance records;
   generating, using a historical resource utilization data of the resource utilization data from the available performance records, for the set of system components, a set of aggregate summary records for the set of address spaces relating to previous executions of the particular job at the set of address spaces; and
   selecting, from the set of address spaces, based on the set of aggregate summary records, a first subset of address spaces for execution of the particular job;
   determining, based on the resource allocation for the particular job and the resource utilization data for the set of system components, a first execution time for the particular job, the first execution time being a time when the computing system achieves a resource availability threshold with respect to the resource allocation; and
   performing, at the first execution time, at the first subset of address spaces the particular job; and
   wherein identifying the resource allocation for the particular job of the set of jobs includes:
   locating, in the resource utilization data for the set of system components, a set of summary records corresponding to a set of execution instances of the particular job, wherein the set of summary records includes a job execution status and historical resource usage data for the set of execution instances of the particular job;
   determining a subset of the set of summary records having a job execution status indicating successful execution of the particular job by analyzing each summary record and removing both summary records that indicate abnormal ending and summary records that include a condition recognized as unsatisfactory based on a condition code; and
   computing, based on a subset of the historical resource usage data for the set of execution instances of the particular job which correlates to the subset of the set of summary records, the resource allocation for the particular job.

2. The method of claim 1, wherein collecting the resource utilization data for the set of system components includes:
   establishing a data collection time interval for the set of performance monitors; and
   initiating, based on the data collection time interval, periodic collection of the resource utilization data.

3. The method of claim 1, wherein the resource utilization data for the set of system components includes both historical resource utilization data for the set of system components as well as current resource utilization data for the set of system components.

4. The method of claim 3, wherein determining the first execution time for the particular job includes:
   comparing the resource allocation for the particular job with a set of time slots of the current resource utilization data;
   determining, in response to comparing the resource allocation for the particular job with the set of time slots, a first time slot of the set of time slots that achieves the resource availability threshold with respect to the resource allocation for the particular job; and
   scheduling, in the first time slot, the particular job of the set of jobs.

5. The method of claim 4, wherein when the first time slot fails to achieve a resource availability threshold with respect to the resource allocation for the particular job, the method further comprises;
   registering, in a hold queue for subsequent scheduling, the particular job; and
   scheduling, in response to determining that a second time slot of the set of time slots achieves the resource availability threshold, the particular job in the second time slot.

6. A computer system comprising:
   at least one processor;
   a memory coupled to the at least one processor; and
   a job scheduling management mechanism executed by one or more of the at least one processor, the job scheduling management mechanism including:
   a collecting module to collect, using a set of performance monitors, resource utilization data for a set of system components of the computing system, the resource utilization data including performance records for a set of jobs and indicating a degree of usage in relation to a system architecture limitations of a respective system component;

an identifying module to identify, by analyzing the resource utilization data for the set of system components, a resource allocation for a particular job of the set of jobs based on a current resource utilization data of the resource utilization data for the set of system components, a set of address spaces for job execution, wherein the set of address spaces has been used previously for a particular job of the set of jobs, wherein the particular job is executed by the computing system at regular intervals and includes available performance records, the identifying module further configured to generate, using a historical resource utilization data of the resource utilization data from the available performance records, for the set of system components, a set of aggregate summary records for the set of address spaces relating to previous executions of the particular job at the set of address spaces; and further configured to select, from the set of address spaces, based on the set of aggregate summary records, a first subset of address spaces for execution of the particular job the identification module further comprising:

a locating module to locate, in the resource utilization data for the set of system components, a set of summary records corresponding to a set of execution instances of the particular job, wherein the set of summary records includes a job execution status and historical resource usage data for the set of execution instances of the particular job;

a second determining module to determine a subset of the set of summary records having a job execution status indicating successful execution of the particular job by analyzing each summary record and removing both summary records that indicate abnormal ending and summary records that include a condition recognized as unsatisfactory based on a condition code; and a computing module to compute, based on a subset of the historical resource usage data for the set of execution instances of the particular job which correlates to the subset of the set of summary records, the resource allocation for the particular job;

a determining module to determine, based on the resource allocation for the particular job and the resource utilization data for the set of system components, a first execution time for the particular job, the first execution time being a time when the computer system achieves a resource availability threshold with respect to the resource allocation; and a performing module to perform, at the first execution time, at the first subsets of address spaces the particular job.

7. The system of claim 6, wherein the collecting module includes:

an establishing module to establish a data collection time interval for the set of performance monitors; and an initiating module to initiate, based on the data collection time interval, periodic collection of the resource utilization data.

8. The system of claim 6, wherein the resource utilization data for the set of system components includes both historical resource utilization data for the set of system components as well as current resource utilization data for the set of system components.

9. The system of claim 6, wherein the determining module includes:

a comparing module to compare the resource allocation for the particular job with a set of time slots of the current resource utilization data;

a third determining module to determine, in response to comparing the resource allocation for the particular job with the set of time slots, a first time slot of the set of time slots that achieves the resource availability threshold with respect to the resource allocation for the particular job; and a scheduling module to schedule, in the first time slot, the particular job of the set of jobs.

10. A computer program product comprising a computer readable storage medium having computer readable program instructions stored therein, wherein the computer readable program instructions, when executed on at least one programmable processor, causes the at least one programmable processor to:

collect, using a set of performance monitors, resource utilization data for a set of system components of the computing device, the resource utilization data including performance records for a set of jobs and indicating a degree of usage in relation to a system architecture limitations of a respective system component;

identify, by analyzing the resource utilization data for the set of system components, a resource allocation for a particular job of the set of jobs based on a current resource utilization data of the resource utilization data for the set of system components, a set of address spaces for job execution, wherein the set of address spaces has been used previously for a particular job of the set of jobs, wherein the particular job is executed by the computing system at regular intervals and includes available performance records;

generate, using a historical resource utilization data of the resource utilization data from the available performance records, for the set of system components, a set of aggregate summary records for the set of address spaces relating to previous executions of the particular job at the set of address spaces; and select, from the set of address spaces, based on the set of aggregate summary records, a first subset of address spaces for execution of the particular job;

determine, based on the resource allocation for the particular job and the resource utilization data for the set of system components, a first execution time for the particular job, the first execution time being a time when the computing device achieves a resource availability threshold with respect to the resource allocation; and perform, at the first execution time, at the first subset of address spaces the particular job; and wherein instructions to identify the resource allocation for the particular job of the set of jobs includes instructions to:

locate, in the resource utilization data for the set of system components, a set of summary records corresponding to a set of execution instances of the particular job, wherein the set of summary records includes a job execution status and historical resource usage data for the set of execution instances of the particular job;

determine a subset of the set of summary records having a job execution status indicating successful execution of the particular job by analyzing each summary record and removing both summary records that indicate abnormal ending and summary records that include a condition recognized as unsatisfactory based on a condition code; and compute, based on a subset of the historical resource usage data for the set of execution instances of the particular job which correlates to the subset of the set of summary records, the resource allocation for the particular job.

11. The computer program product of claim 10, wherein the program instructions are further configured to cause the at least one programmable processor to:

establish a data collection time interval for the set of performance monitors; and initiate, based on the data collection time interval, periodic collection of the resource utilization data.

12. The computer program product of claim 10, wherein the resource utilization data for the set of system components includes both historical resource utilization data for the set of system components as well as current resource utilization data for the set of system components.

13. The computer program product of claim 12, wherein the program instructions are further configured to cause the at least one programmable processor to:

compare the resource allocation for the particular job with a set of time slots of the current resource utilization data; and determine, in response to comparing the resource allocation for the particular job with the set of time slots, a first time slot of the set of time slots that achieves the resource availability threshold with respect to the resource allocation for the particular job; and schedule, in the first time slot, the particular job of the set of jobs.

14. The computer program product of claim 13, wherein the program instructions are further configured to cause the at least one programmable processor to:

determine, in response to comparing the resource allocation for the particular job with the set of time slots, that the first time slot fails to achieve a resource availability threshold with respect to the resource allocation for the particular job;

register, in a hold queue for subsequent scheduling, the particular job; and schedule, in response to determining that a second time slot of the set of time slots achieves the resource availability threshold, the particular job in the second time slot.

* * * * *